US012792823B2

(12) United States Patent
Motoki et al.

(10) Patent No.: US 12,792,823 B2
(45) Date of Patent: Nov. 10, 2026

(54) INFORMATION PROCESSING SYSTEM, NON-TRANSITORY COMPUTER READABLE MEDIUM STORING PROGRAM, AND INFORMATION PROCESSING METHOD FOR MANAGING AND DISPLAYING ANNOTATION INFORMATION ON AN ELECTRONIC DOCUMENT IN ASSOCIATION WITH A LINK OBJECT INCLUDED IN THE ELECTRONIC DOCUMENT

(71) Applicant: FUJIFILM Business Innovation Corp., Tokyo (JP)

(72) Inventors: Yuichi Motoki, Kanagawa (JP); Takenori Matsuo, Kanagawa (JP); Masahiro Yamada, Kanagawa (JP); Yohei Uchiumi, Kanagawa (JP); Himika Kumagai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/456,527

(22) Filed: Aug. 28, 2023

(65) Prior Publication Data

US 2024/0330575 A1 Oct. 3, 2024

(30) Foreign Application Priority Data

Mar. 27, 2023 (JP) ................................ 2023-050296

(51) Int. Cl.
*G06F 40/169* (2020.01)
*G06F 16/34* (2025.01)

(52) U.S. Cl.
CPC .......... *G06F 40/169* (2020.01); *G06F 16/345* (2019.01)

(58) Field of Classification Search
CPC .... G06F 40/169; G06F 16/345; G06F 16/958; G06F 16/9558; G06F 16/904
See application file for complete search history.

(56) References Cited

U.S. PATENT DOCUMENTS 7,155,489 B1 * 12/2006 Heilbron ............ G06F 16/9577 709/219
7,653,872 B2 1/2010 Yamashita et al.
(Continued)

FOREIGN PATENT DOCUMENTS

| | | |
|---|---|---|
| EP | 1582995 | 10/2005 |
| JP | 2003196145 | 7/2003 |
| JP | 2006018493 | 1/2006 |

OTHER PUBLICATIONS

"Search Report of Europe Counterpart Application", issued on Apr. 4, 2024, p. 1-p. 9.

*Primary Examiner* — Matthew Ell
(74) *Attorney, Agent, or Firm* — JCIPRNET

(57) ABSTRACT

An information processing system includes one or plural processors configured to, in a case where a link object that is included in an electronic document and that is associated with information for accessing a web page is designated, access the web page and acquire information about the web page, based on the acquired information about the web page, convert the web page into another electronic document of a format displayable in an offline environment and manage the other electronic document in association with annotation information, and display the annotation information on the electronic document in association with the link object.

18 Claims, 12 Drawing Sheets

(56) References Cited

U.S. PATENT DOCUMENTS

| | | | | |
|---|---|---|---|---|
| 9,305,170 | B1* | 4/2016 | Gauvin | G06F 40/197 |
| 2006/0005117 | A1* | 1/2006 | Yamashita | G06F 40/169<br>715/205 |
| 2008/0201633 | A1 | 8/2008 | Huang et al. | |
| 2010/0299591 | A1 | 11/2010 | Suehiro et al. | |
| 2012/0278403 | A1* | 11/2012 | Costenaro | G06F 16/954<br>709/206 |
| 2015/0067779 | A1* | 3/2015 | Agawa | H04L 63/08<br>726/3 |
| 2019/0289011 | A1 | 9/2019 | Kamiya et al. | |
| 2020/0125220 | A1* | 4/2020 | Aizu | H04L 12/12 |

* cited by examiner

FIG. 8

| TAG ID | URL INFORMATION | DATE AND TIME OF CONVERSION | DATE AND TIME OF LAST UPDATE | SCHEDULED DATE AND TIME OF DELETION |
|---|---|---|---|---|
| 1 | https://www.abcdef.com | 12/1/20XX 10:00 | | 12/6/20XX 10:00 |
| 2 | https://www.abcdef0.sp.com | 12/3/20XX 13:00 | 12/4/20XX 13:00 | 12/9/20XX 13:00 |
| | | | | |
| | | | | |

INFORMATION PROCESSING SYSTEM, NON-TRANSITORY COMPUTER READABLE MEDIUM STORING PROGRAM, AND INFORMATION PROCESSING METHOD FOR MANAGING AND DISPLAYING ANNOTATION INFORMATION ON AN ELECTRONIC DOCUMENT IN ASSOCIATION WITH A LINK OBJECT INCLUDED IN THE ELECTRONIC DOCUMENT

CROSS-REFERENCE TO RELATED APPLICATIONS

This application is based on and claims priority under 35 USC 119 from Japanese Patent Application No. 2023-050296 filed Mar. 27, 2023.

BACKGROUND

(i) Technical Field

The present invention relates to an information processing system, a non-transitory computer readable medium storing a program, and an information processing method.

(ii) Related Art

An electronic document including a link object associated with information for accessing a web page is to be viewed in, for example, an online environment. On the other hand, as a technology that enables access to the web page of a link destination from the link object included in the electronic document even in an offline environment, a technology for manually downloading information about the web page in advance has been known (for example, JP2006-018493A).

SUMMARY

However, manually downloading the web page of the link destination in advance requires effort of a user.

Aspects of non-limiting embodiments of the present disclosure relate to an information processing system, a non-transitory computer readable medium storing a program, and an information processing method that reduce effort required for accessing a web page of a link destination in the case of viewing an electronic document including a link object in an offline environment, compared to the effort in a case where a user manually downloads the web page of the link destination associated with the link object in advance.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including one or a plurality of processors configured to, in a case where a link object that is included in an electronic document and that is associated with information for accessing a web page is designated, access the web page and acquire information about the web page, based on the acquired information about the web page, convert the web page into another electronic document of a format displayable in an offline environment and manage the other electronic document in association with annotation information, and display the annotation information on the electronic document in association with the link object.

BRIEF DESCRIPTION OF THE DRAWINGS

Exemplary embodiment(s) of the present invention will be described in detail based on the following figures, wherein:

FIG. 8 is a diagram illustrating a specific example of the annotation information stored in a database;

FIG. 10A is a diagram illustrating the electronic document on which a plurality of pieces of annotation information before performing the conversion at once are displayed, and FIG. 10B is a diagram illustrating the electronic document on which a plurality of pieces of annotation information after performing the conversion at once are displayed.

DETAILED DESCRIPTION

Hereinafter, an exemplary embodiment of the present invention will be described in detail with reference to the accompanying drawings.

Overall Configuration of Information Processing System

Figure 1:
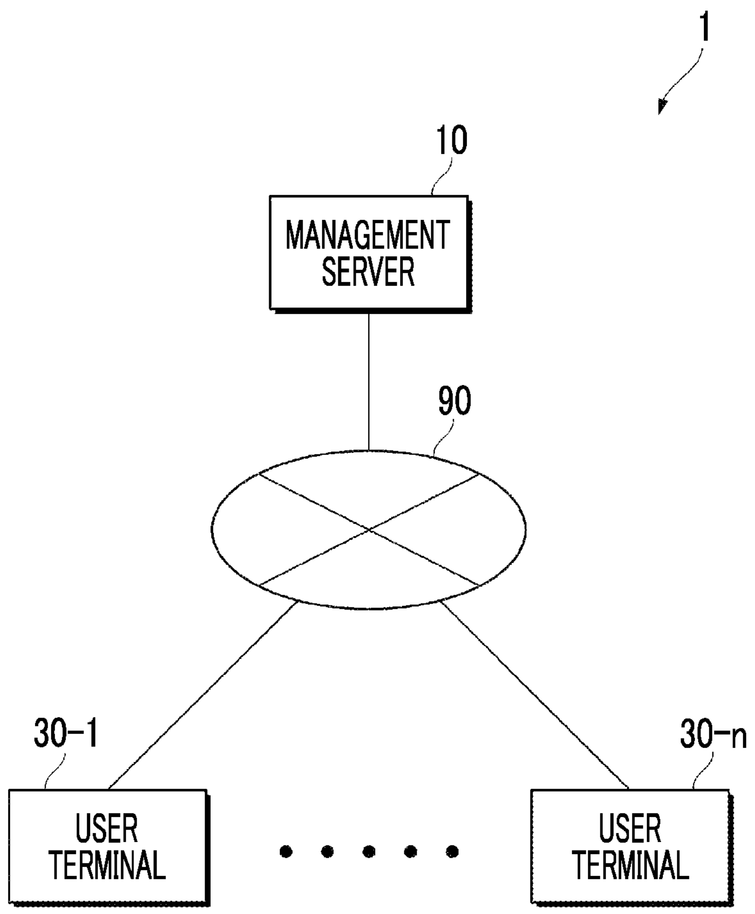
FIG. 1 is a diagram illustrating an example of an overall configuration of an information processing system to which the present exemplary embodiment is applied.

FIG. 1 is a diagram illustrating an example of an overall configuration of an information processing system 1 to which the present exemplary embodiment is applied.

The information processing system 1 is configured by connecting a management server 10 to user terminals 30-1 to 30-*n* (n is an integer value greater than or equal to 1) via a network 90. The network 90 is, for example, a local area network (LAN) or the Internet. Hereinafter, the user terminals 30-1 to 30-*n* will be collectively referred to as a "user terminal 30" unless necessary to be individually described.

Management Server

The management server 10 constituting the information processing system 1 is an information processing apparatus as a server that manages the entire information processing system 1. The management server 10 performs processing of acquiring various types of information transmitted from each of the user terminal 30 and the outside, various types of processing with respect to the acquired various types of information, and processing of transmitting various types of information toward each of the user terminal 30 and the outside.

For example, in a case where a link object that is included in an electronic document and that is associated with information for accessing a web page is designated, the management server 10 accesses the web page and acquires information about the web page. Here, the "electronic document" is, for example, a document of a Word format. In addition, the "information for accessing the web page" is, for example, a uniform resource locator (URL). In addition, the "information about the web page" includes information indicating content of the web page and information related to permission to access the web page.

In addition, the management server 10 converts the web page into another electronic document of a format displayable in an offline environment and manages the other electronic document in association with annotation information based on the acquired information about the web page. Here, the "format displayable in the offline environment" is, for example, a document of a PDF format. Hereinafter, the other electronic document obtained by converting the web page into the format displayable in the offline environment will be referred to as a "post-conversion page". The management server 10 displays the annotation information associated with the post-conversion page near the link object included in the electronic document.

As the annotation information displayed on the electronic document, the management server 10 displays a summary of the information about the web page that is a link destination of the link object. Examples of the "summary of the information about the web page" include information indicating a timing at which the information about the web page is acquired, and information indicating a timing at which a format of the web page is converted.

In addition, in a case where a predetermined condition is satisfied, the management server 10 displays information indicating satisfaction of the condition on the electronic document as the annotation information. Examples of the information indicating satisfaction of the predetermined condition include information indicating elapse of a predetermined period since acquiring the information about the web page of the link destination of the link object and converting the format, information indicating that the web page of the link destination is not accessible using the information for accessing the web page associated with the link object, and information indicating that a security vulnerability is identified on the web page of the link destination.

In addition, in a case where a predetermined condition is satisfied, the management server 10 performs a control of not displaying the annotation information on the electronic document. That is, in a case where a predetermined condition is satisfied, the management server 10 deletes the annotation information displayed on the electronic document. The "predetermined condition" is elapse of a predetermined period since acquiring the information about the web page and converting the format, elapse of a predetermined period since the user views the post-conversion page for the last time, elapse of a period determined based on a schedule of the user related to use of the electronic document, or designation indicating not displaying the annotation information by an input operation of the user.

In addition, the management server 10 changes a display aspect of the annotation information on the electronic document depending on content of the information about the web page. For example, the management server 10 changes the display aspect of the annotation information on the electronic document depending on whether or not the predetermined period has elapsed since acquiring the information about the web page and converting the format, whether or not the web page is not accessible using information stored as the information for accessing the web page, or whether or not a security vulnerability is identified on the web page.

In addition, in a case where a predetermined period has elapsed from conversion of the web page into the annotation information, the management server 10 acquires the information about the web page again and converts the acquired information into the annotation information. In addition, for a plurality of pieces of annotation information for which the predetermined period has elapsed from conversion of the web page into the annotation information, the management server 10 acquires the information about the web page again and updates the annotation information at once. Details of the configuration and processing of the management server 10 will be described later.

User Terminal

The user terminal 30 is an information processing apparatus such as a smartphone, a tablet terminal, or a personal computer operated by the user who uses the information processing system 1. The user terminal 30 performs processing of acquiring various types of information transmitted from each of the management server 10 and the outside, various types of processing with respect to the acquired various types of information, and processing of transmitting various types of information toward each of the management server 10 and the outside. For example, the user terminal 30 transmits input information input by the user toward each of the management server 10 and the outside. Details of the configuration and processing of the user terminal 30 will be described later.

The above configuration of the information processing system 1 is merely an example, and the information processing system 1 as a whole may have functions that implement the above processing. Thus, all or a part of the functions implementing the above processing may be shared or used in cooperation with each other in the information processing system 1. That is, all or a part of the functions of the management server 10 may be provided as functions of the user terminal 30, or all or a part of the functions of the user terminal 30 may be provided as functions of the management server 10. In addition, all or a part of the functions of each of the management server 10 and the user terminal 30 constituting the information processing system 1 may be transferred over to another server or the like, not illustrated, to perform all or a part of the above processing. Accordingly, the processing of the information processing system 1 as a whole may be accelerated, and the processing can also be complemented.

Hardware Configuration

Hardware Configuration of Management Server

Figure 2:
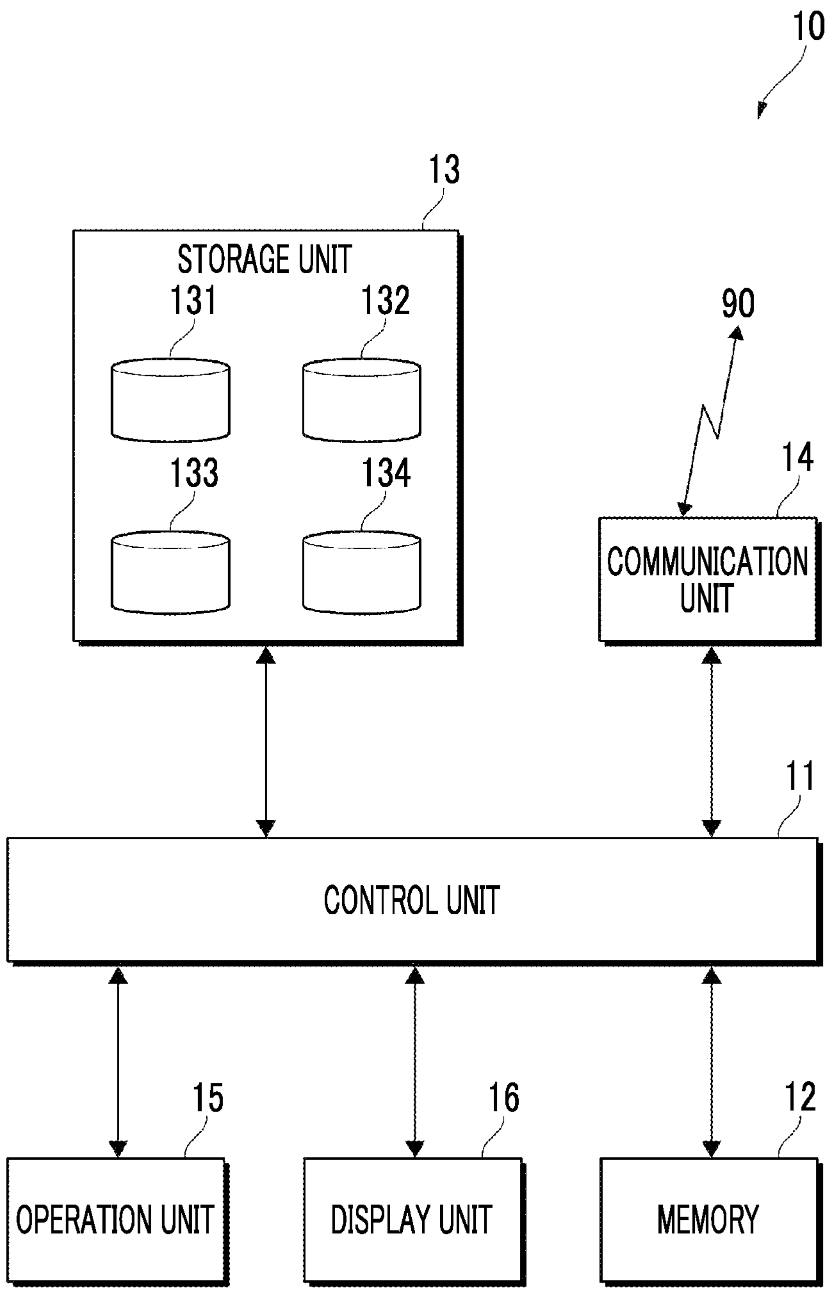
FIG. 2 is a diagram illustrating an example of a hardware configuration of a management server.

FIG. 2 is a diagram illustrating an example of a hardware configuration of the management server 10.

The management server 10 includes a control unit 11, a memory 12, a storage unit 13, a communication unit 14, an operation unit 15, and a display unit 16. These units are connected to each other via a data bus, an address bus, a peripheral component interconnect (PCI) bus, or the like.

The control unit 11 is a processor that controls the functions of the management server 10 by executing various types of software such as an OS (basic software) and application software (software applications). The control unit 11 is configured with, for example, a central processing unit (CPU). The memory 12 is a storage region in which various types of software and data and the like used for executing the software are stored, and is used as a work area in operations. The memory 12 is configured with, for example, a random access memory (RAM).

The storage unit 13 is a storage region in which input data for various types of software, output data from various types of software, and the like are stored. The storage unit 13 is configured with, for example, a hard disk drive (HDD), a solid state drive (SSD), or a semiconductor memory used for storing programs, various types of setting data, and the like. Databases that store various types of information are stored in the storage unit 13. The databases stored in the storage unit 13 include, for example, a post-conversion page DB 131 in which the post-conversion page is stored, an annotation DB 132 in which the annotation information is stored, a web page DB 133 in which the information about the web page of the link destination of the link object is stored, and a user DB 134 in which information related to the user is stored.

The communication unit 14 transmits and receives data to and from the user terminal 30 and the outside via the network 90. The operation unit 15 is configured with, for example, a keyboard, a mouse, a mechanical button, or a switch and receives an input operation. The operation unit 15 may include a touch sensor that is integrated with the display unit 16 to constitute a touch panel. The display unit 16 is configured with, for example, a liquid crystal display or an organic electro luminescence (EL) display used for displaying information and displays image (video and still image) data, text data, and the like.

Hardware Configuration of User Terminal

A hardware configuration of the user terminal 30 has the same configuration as the hardware configuration of the management server 10 illustrated in FIG. 2. That is, the user terminal 30 includes each of a control unit, a memory, a storage unit, a communication unit, an operation unit, and a display unit having the same functions as each of the control unit 11, the memory 12, the storage unit 13, the communication unit 14, the operation unit 15, and the display unit 16 in FIG. 2 and will not be illustrated or described.

Functional Configuration

Management Server

Figure 3:
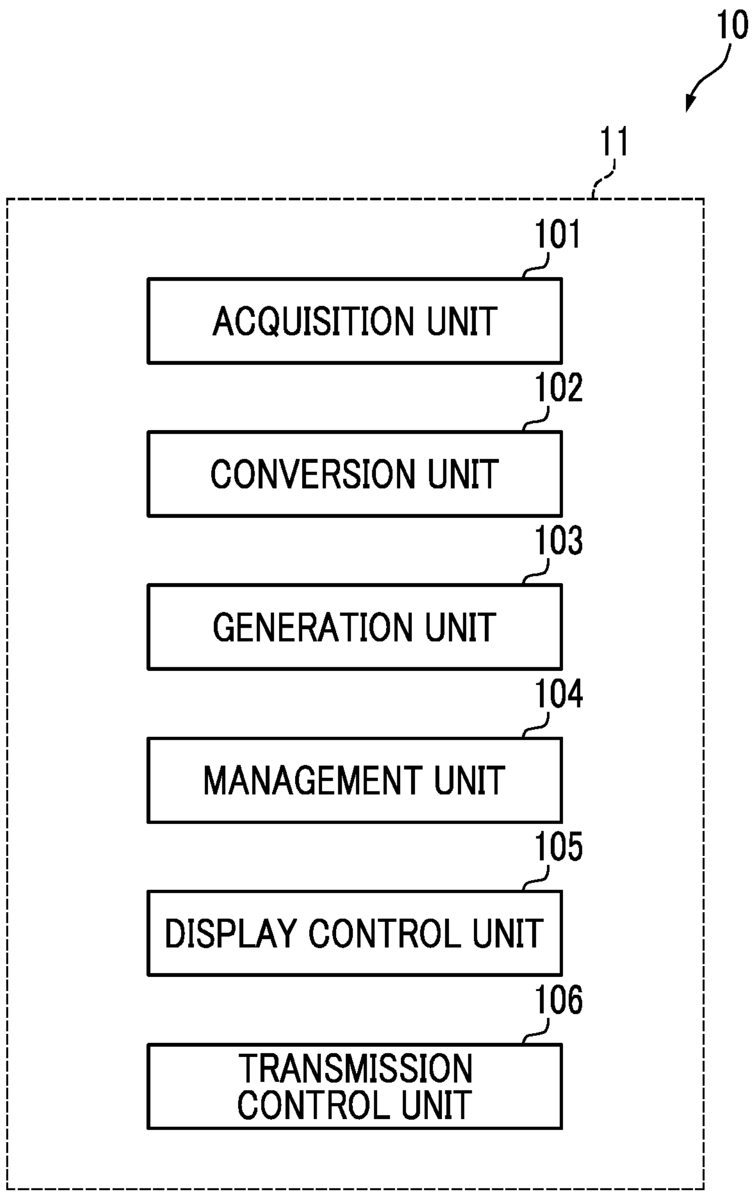
FIG. 3 is a diagram illustrating an example of a functional configuration of a control unit of the management server.

FIG. 3 is a diagram illustrating an example of a functional configuration of the control unit 11 of the management server 10.

An acquisition unit 101, a conversion unit 102, a generation unit 103, a management unit 104, a display control unit 105, and a transmission control unit 106 function in the control unit 11 of the management server 10.

The acquisition unit 101 acquires various types of information. For example, the acquisition unit 101 acquires various types of information transmitted from each of the user terminal 30 and the outside. Examples of the information transmitted from the user terminal 30 in the information acquired by the acquisition unit 101 include the input information input by an operation of the user. The input information acquired by the acquisition unit 101 is, for example, information (for example, a URL) for accessing the link destination of the link object designated by the user. In addition, the acquisition unit 101 accesses the web page of the link destination of the link object designated by the user and acquires the information about the web page.

The conversion unit 102 converts the web page into the other electronic document of the format displayable in the offline environment based on the information about the web page of the link destination acquired by the acquisition unit 101. In the present exemplary embodiment, the conversion unit 102 converts the web page of the link destination into the electronic document of the PDF format (that is, the post-conversion page).

The generation unit 103 generates the annotation information. Specifically, the generation unit 103 generates the annotation information associated with the post-conversion page of the PDF format generated as a result of conversion processing of the format by the conversion unit 102.

The management unit 104 stores and manages various types of information in the databases of the storage unit 13 (refer to FIG. 2). For example, the management unit 104 stores and manages the post-conversion page generated as a result of the conversion processing performed by the conversion unit 102 in the post-conversion page DB 131. In addition, the management unit 104 stores and manages the annotation information generated by the generation unit 103 in the annotation DB 132. In addition, the management unit 104 stores and manages the information about the web page of the link destination of the link object in the web page DB 133. In addition, the management unit 104 stores and manages the information related to the user in the user DB 134.

Here, the management unit 104 manages the post-conversion page stored in the post-conversion page DB 131, the annotation information stored in the annotation DB 132, the information about the web page stored in the web page DB 133, and the information related to the user stored in the user DB 134 in association with each other.

The display control unit 105 performs a control for displaying various types of information on a display unit 36 of the user terminal 30. Specifically, the display control unit 105 transmits control information for displaying various types of information toward the user terminal 30. For example, the display control unit 105 transmits control information for displaying the annotation information on the electronic document toward the user terminal 30. In addition, the display control unit 105 transmits control information for displaying the post-conversion page toward the user terminal 30.

The transmission control unit 106 performs a control of transmitting various types of information. Specifically, the transmission control unit 106 performs a control of transmitting various types of information toward each of the user terminal 30 and the outside. In the information of which transmission is controlled by the transmission control unit 106, the information transmitted toward the user terminal 30 is, for example, the control information for displaying the annotation information on the electronic document and the control information for displaying the post-conversion page.

User Terminal

Figure 4:
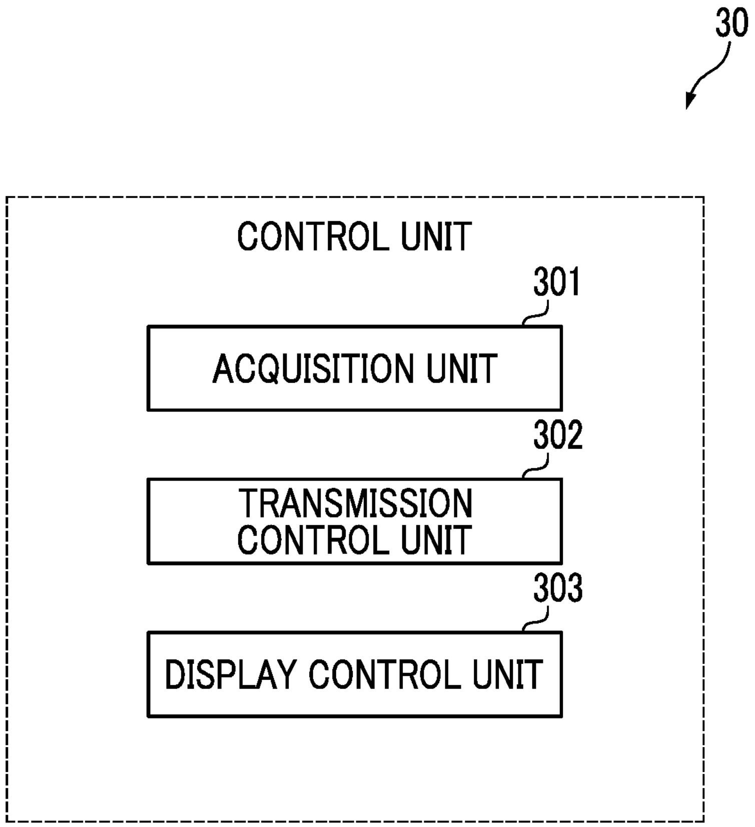
FIG. 4 is a diagram illustrating an example of a functional configuration of a control unit of a user terminal.

FIG. 4 is a diagram illustrating an example of a functional configuration of the control unit of the user terminal 30.

An acquisition unit 301, a transmission control unit 302, and a display control unit 303 function in the control unit of the user terminal 30.

The acquisition unit 301 acquires various types of information. Specifically, the acquisition unit 301 acquires input information input by the operation unit. In addition, the acquisition unit 301 acquires various types of information transmitted from the management server 10 and from the outside. In the information acquired by the acquisition unit 301, the information transmitted from the management server 10 is, for example, the control information for displaying various types of information on the display unit 36.

The transmission control unit 302 performs a control of transmitting various types of information via a communication unit 34. Specifically, the transmission control unit 302 performs a control of transmitting various types of information toward the management server 10 and toward the outside. In the information of which transmission is controlled by the transmission control unit 302, the information transmitted toward the management server 10 is, for example, information input by an operation of the user.

The display control unit 303 performs a control for displaying various types of information on the display unit 36. For example, the display control unit 303 performs a control for displaying the electronic document including the annotation information on the display unit 36. In addition, the display control unit 303 performs a control for displaying the post-conversion page on the display unit 36. A specific example of the electronic document including the annotation information displayed on the user terminal 30 will be described later with reference to FIG. 7.

Flow of Processing

Flow of Processing of Management Server

Figure 5:
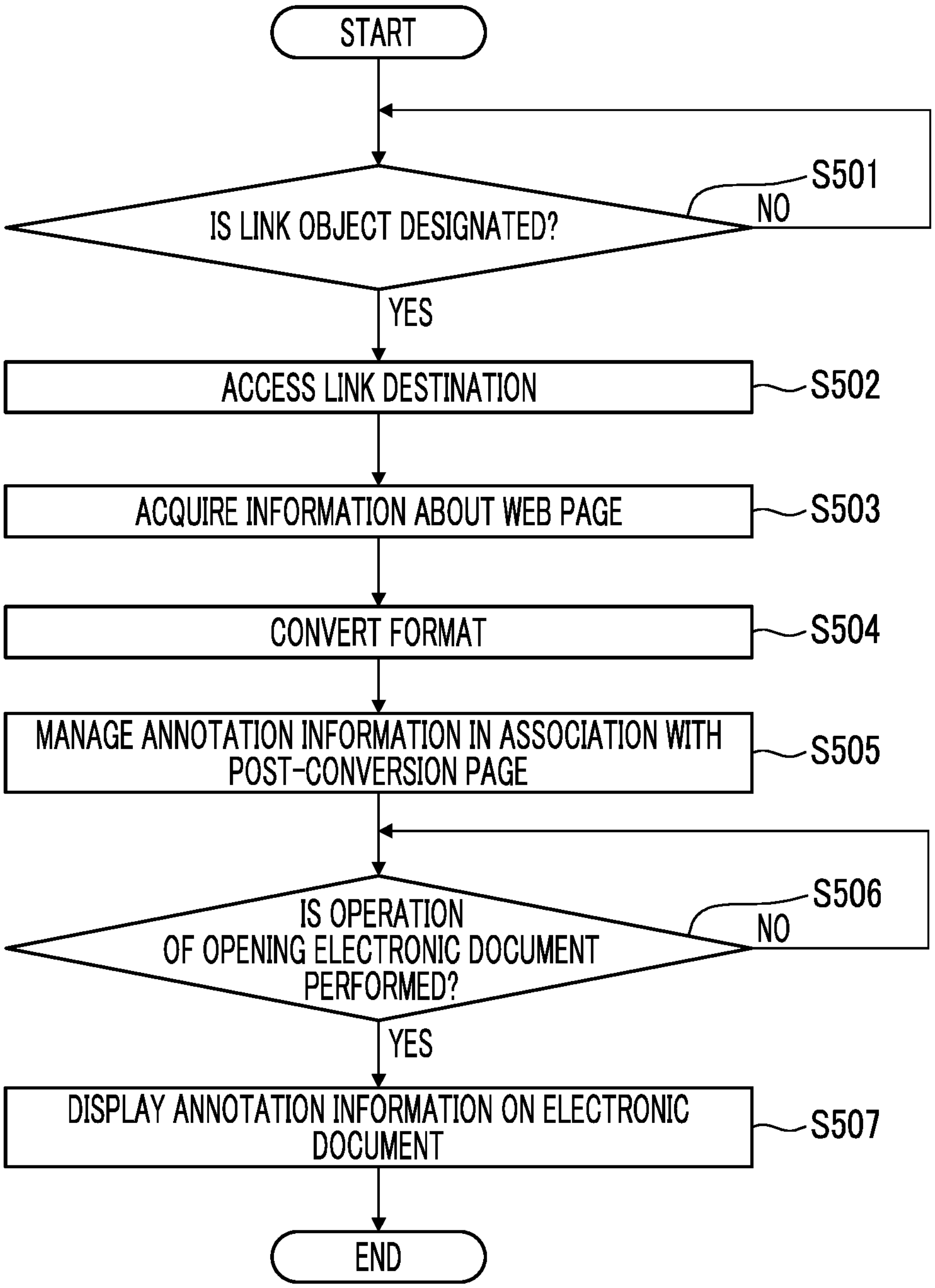
FIG. 5 is a flowchart illustrating an example of a flow of processing to display annotation information on an electronic document in processing of the management server.

FIG. 5 is a flowchart illustrating an example of a flow of processing to display the annotation information on the electronic document in processing of the management server 10.

In a case where the link object that is included in the electronic document and that is associated with the information for accessing the web page is designated (YES in step S501), the management server 10 accesses the link destination (step S502) and acquires the information about the web page of the link destination (step S503). On the other hand, in a case where the link object included in the electronic document is not designated (NO in step S501), determination processing in step S501 is repeated until the link object is designated.

The management server 10 converts the format of the web page based on the information about the web page of the link destination acquired in step S503 (step S504). Specifically, the management server 10 performs conversion into the other electronic document of the format displayable in the offline environment. The management server 10 manages the annotation information in association with the post-conversion page (step S505).

In a case where an operation of opening the electronic document is performed (YES in step S506), the management server 10 displays the annotation information on the electronic document (step S507). For example, the management server 10 displays the annotation information near the link object included in the electronic document. The annotation information includes, for example, information indicating a date and time of conversion of the web page into the other electronic document. On the other hand, in a case where the operation of opening the electronic document is not performed (NO in step S506), the management server 10 repeats determination processing in step S506 until the operation of opening the electronic document is performed.

Figure 6:
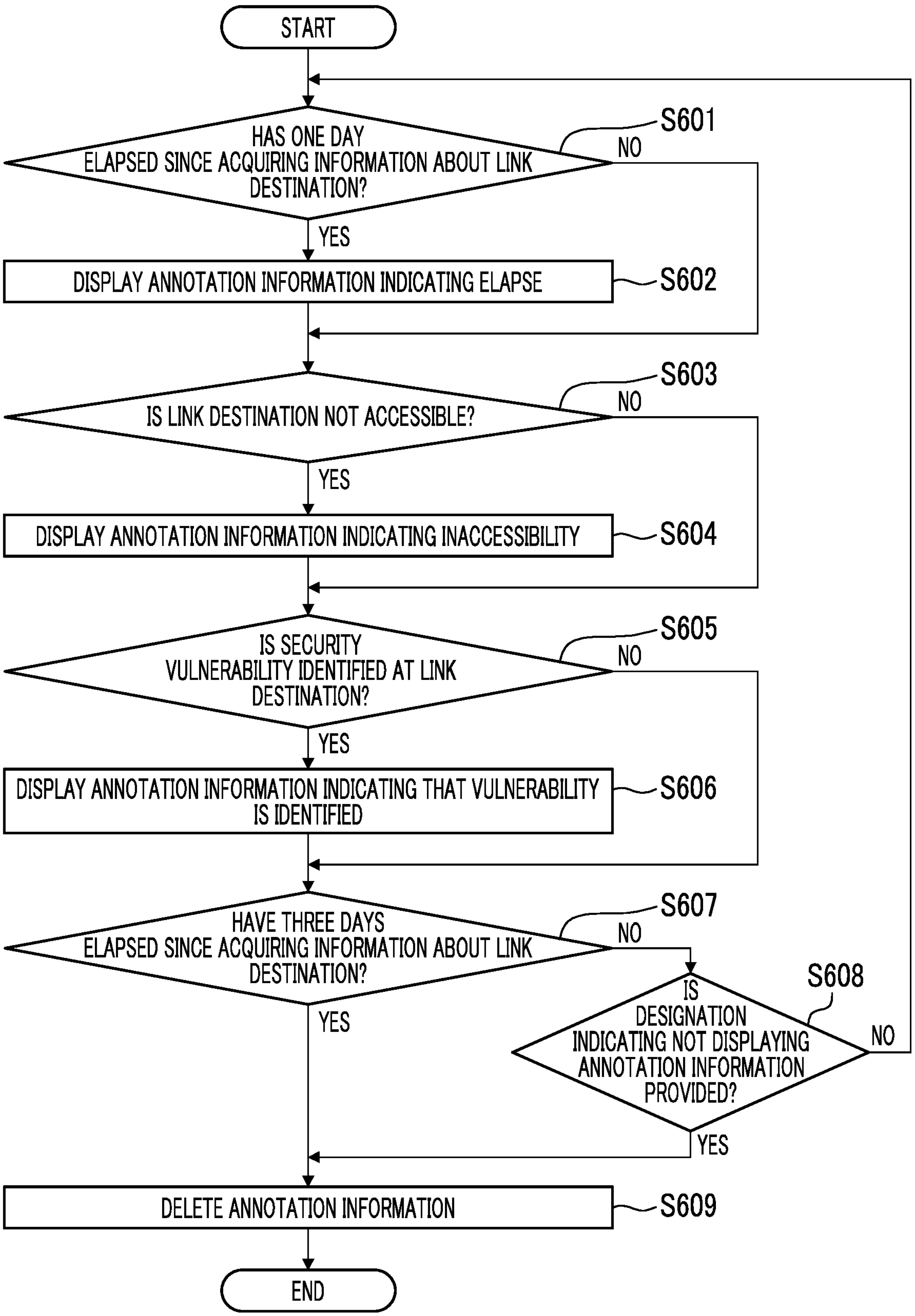
FIG. 6 is a flowchart illustrating an example of a flow of processing after displaying the annotation information on the electronic document in the processing of the management server.

FIG. 6 is a flowchart illustrating an example of a flow of processing after displaying the annotation information on the electronic document in the processing of the management server 10.

In the example in FIG. 6, in a case where one day has elapsed since acquiring information about the link destination of the link object and converting the format, information indicating the elapse of one day is displayed on the electronic document as the annotation information. In a case where two days have further elapsed (three days since acquiring the information about the link destination), the annotation information is set to be automatically deleted from the electronic document.

In a case where one day has elapsed since acquiring the information about the link destination of the link object as a result of the processing after the annotation information is displayed on the electronic document (YES in step S601), the management server 10 displays the annotation information indicating the elapse of one day since acquiring the information about the link destination on the electronic document (step S602). In this case, the management server 10 may display an indication that the annotation information will be deleted in a case where three days have elapsed since acquiring the information about the link destination, on the electronic document as the annotation information. On the other hand, in a case where one day has not elapsed since acquiring the information about the web page of the link destination (NO in step S601), the management server 10 transitions to determination processing in step S603.

In a case where the link destination associated with the link object is not accessible (YES in step S603), the management server 10 displays the annotation information indicating that the link destination is not accessible, on the electronic document (step S604). For example, the management server 10 displays the annotation information in a display aspect indicating that the link destination is not accessible. On the other hand, in a case where the link destination of the link object can be accessed (NO in step S603), the management server 10 transitions to determination processing in step S605.

In a case where a security vulnerability is identified at the link destination (YES in step S605), the management server 10 displays the annotation information indicating that a security vulnerability is identified at the link destination, on the electronic document (step S606). For example, the management server 10 displays the annotation information in a display aspect indicating that a security vulnerability is identified at the link destination. On the other hand, in a case where a security vulnerability is not identified at the link destination (NO in step S605), the management server 10 transitions to determination processing in step S607.

In a case where three days have elapsed since acquiring the information about the link destination of the link object (YES in step S607), the management server 10 deletes the annotation information displayed on the electronic document (step S609). On the other hand, in a case where three days have not elapsed since acquiring the information about the web page (NO in step S607), the management server 10 transitions to determination processing in step S608.

In a case where the designation indicating not displaying the annotation information is provided by the input operation of the user (YES in step S608), the management server 10 deletes the annotation information displayed on the electronic document (step S609). On the other hand, in a case where the designation indicating not displaying the annotation information is not provided (NO in step S608), the management server 10 returns to determination processing in step S601.

Specific Example

Figure 7:
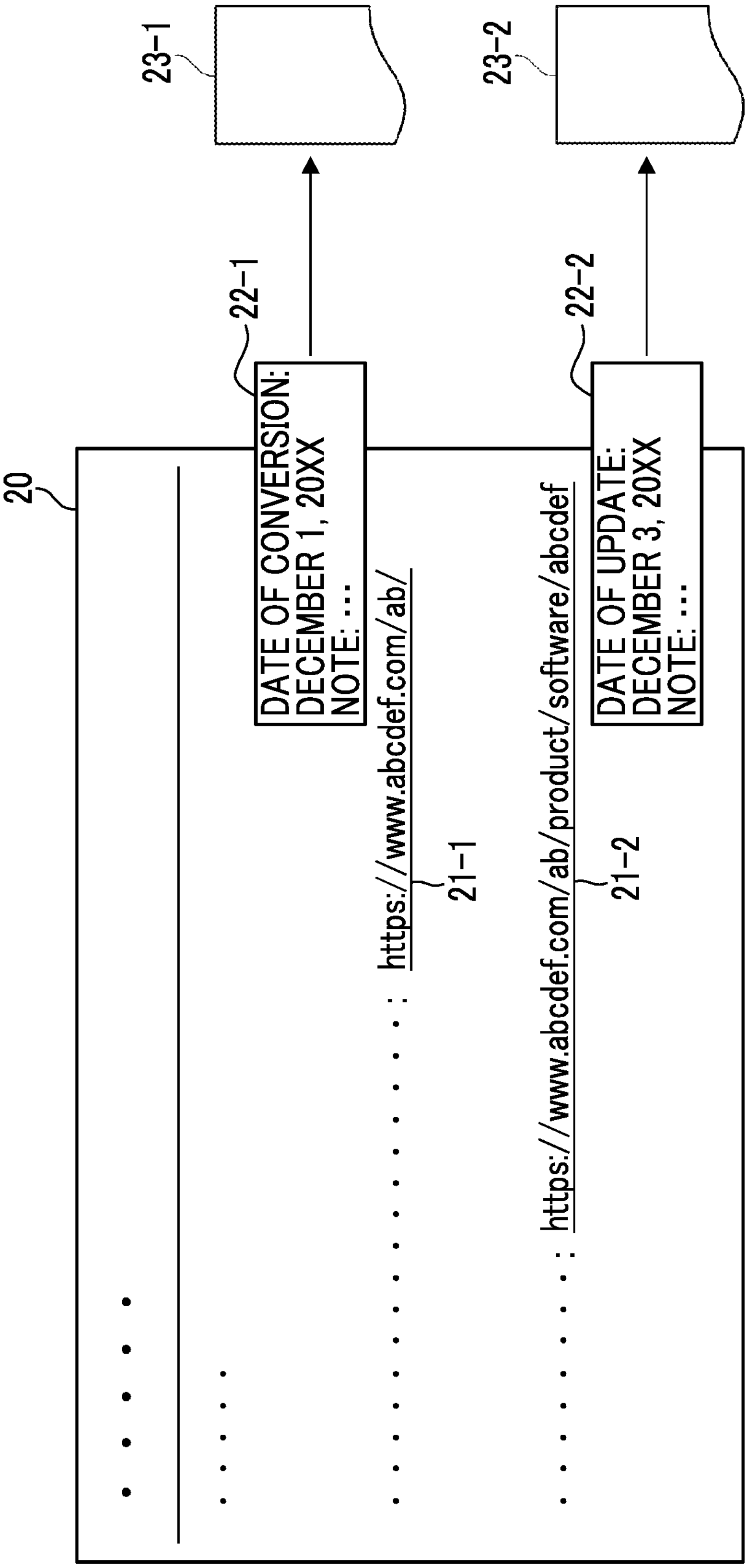
FIG. 7 is a diagram illustrating a specific example of the annotation information displayed on the electronic document.

FIG. 7 is a diagram illustrating a specific example of the annotation information displayed on the electronic document.

An electronic document 20 illustrated in FIG. 7 includes link objects 21-1 and 21-2, and annotation information 22-1 and 22-2 are illustrated near the link objects 21-1 and 21-2, respectively. In a case where the user performs an operation (for example, a tap operation) of selecting the annotation information 22-1, a post-conversion page 23-1 obtained by converting a web page of a link destination of the link object 21-1 into the PDF format is displayed. Accordingly, the user can view content of the web page of the link destination of the link object 21-1 in the offline environment. Similarly, in a case where an operation of selecting the annotation information 22-2 is performed, a post-conversion page 23-2 obtained by converting a web page of a link destination of the link object 21-2 into the PDF format is displayed.

Text data "date of conversion: Dec. 1, 20XX note: . . . " is described in the annotation information 22-1. In addition, text data "date of update: Dec. 3, 20XX note: . . . " is described in the annotation information 22-2. Here, the "date of conversion" as the annotation information indicates a date of conversion of the web page of the link destination of the link object 21-1 for the first time. In addition, the "date of update" indicates a date of the most recent conversion in a case where the web page of the link destination of the link object 21-2 is converted a plurality of times.

FIG. 8 is a diagram illustrating a specific example of the annotation information stored in the database.

The annotation information displayed on the electronic document 20 in FIG. 7 is stored and managed in the annotation DB 132 (refer to FIG. 2). In the annotation DB 132, a tag ID, URL information, a date and time of conversion, a date and time of the last update, and a scheduled date and time of deletion are associated with each other as illustrated in FIG. 8.

Here, the "tag ID" is identification information with which the annotation information can be uniquely specified. The "URL information" is a URL of the web page of the link destination. The "date and time of conversion" is a date and time of conversion of the web page of the link destination of the link object 21-1 for the first time. The "date and time of the last update" is a date and time of the most recent conversion in a case where the web page of the link destination of the link object 21-2 is converted a plurality of times. The "scheduled date and time of deletion" is a scheduled date and time of deletion of the annotation information from the electronic document.

Figure 9:
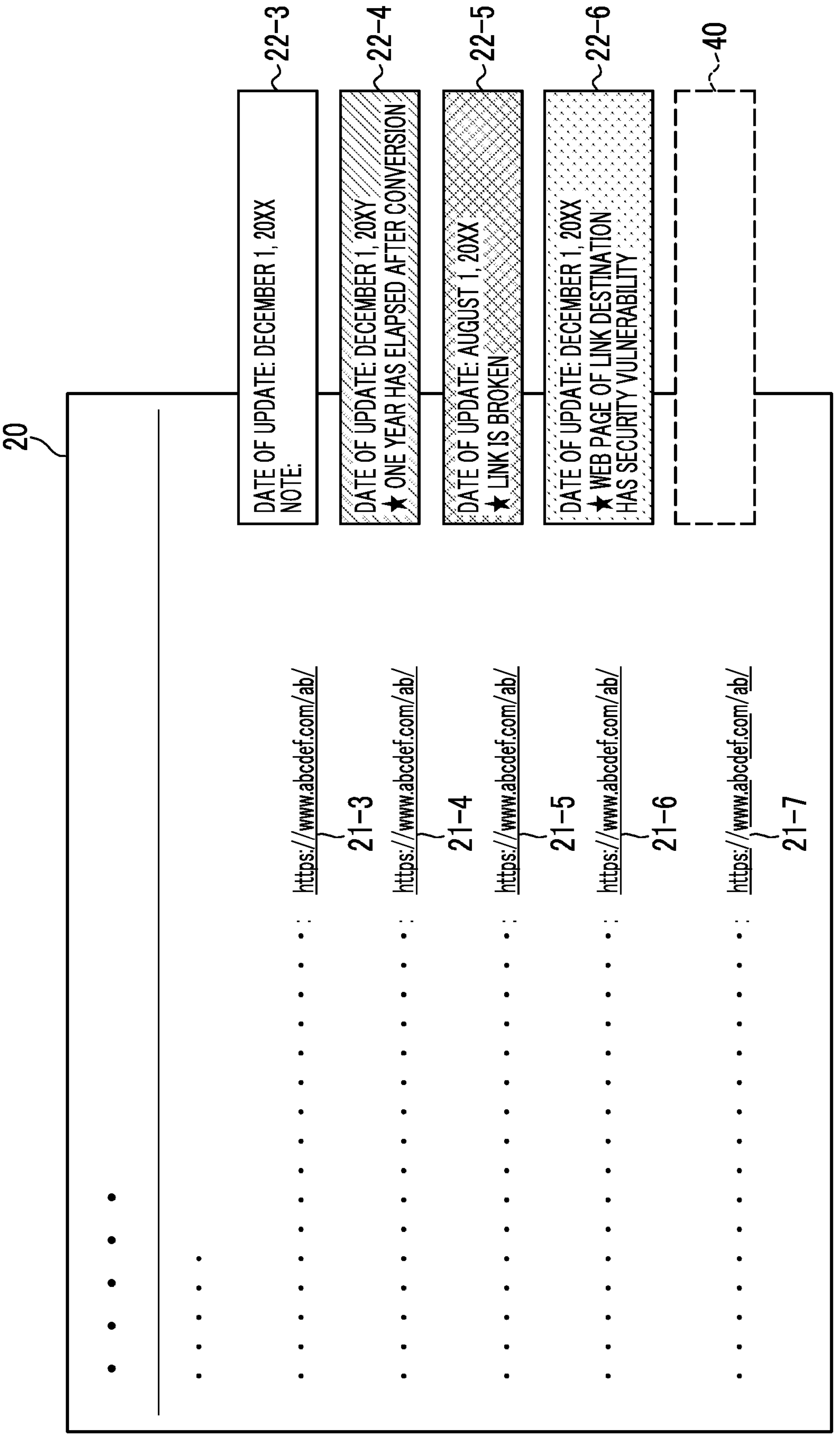
FIG. 9 is a diagram illustrating a specific example of a display aspect of the annotation information.

FIG. 9 is a diagram illustrating a specific example of the display aspect of the annotation information.

The display aspect of the annotation information changes depending on the content of the information about the web page of the link destination. For example, the "change of the display aspect" is a change of color or described text data of the annotation information. The display aspect of the annotation information can be divided into a plurality of patterns.

For example, in annotation information 22-3 corresponding to a link object 21-3 among link objects 21-3 to 21-7 displayed on the electronic document 20 illustrated in FIG. 9, "date of update: Dec. 1, 20XX note: . . . " is described. This display aspect of the annotation information 22-3 indicates that the content of the information about the web page of the link destination is in a normal state.

In addition, in annotation information 22-4 corresponding to the link object 21-4, "date of update: Dec. 1, 20XY ★ one year has elapsed after conversion" is described as the annotation information. This display aspect of the annotation information 22-4 indicates that one year that is the predetermined period has elapsed after acquiring the information about the web page of the link destination.

In addition, in annotation information 22-5 corresponding to the link object 21-5, "date of update: Aug. 1, 20XX ★ link is broken" is described. This display aspect of the annotation information 22-5 indicates a state where the web page of the link destination is not accessible because of out-of-date URL information of the link destination associated with the link object 21-5 (because of a so-called "broken link").

In addition, in annotation information 22-6 corresponding to the link object 21-6, "date of update: Dec. 1, 20XX ★ web page of link destination has security vulnerability" is described as the annotation information. This display aspect of the annotation information 22-6 indicates that a security vulnerability is identified on the web page of the link destination.

In addition, a broken line frame 40 illustrated in FIG. 9 indicates that the annotation information displayed near the link object 21-7 is deleted because the predetermined period has elapsed since acquiring the information about the web page of the link destination. The broken line frame 40 is not actually displayed and indicates that the annotation information displayed in the broken line frame 40 is deleted.

Figure 10A:
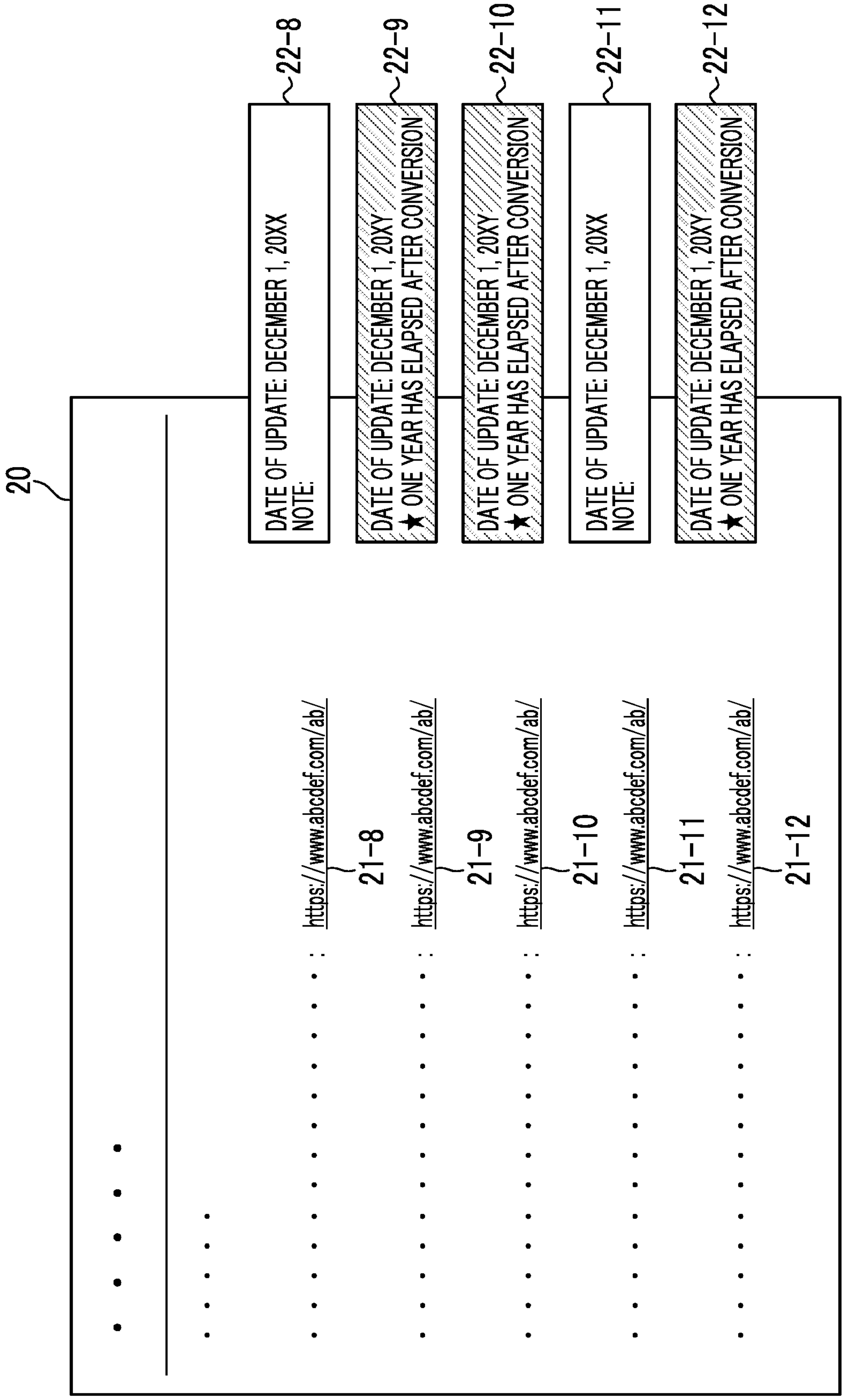
FIGS. 10A and 10B are diagrams illustrating a specific example of conversion of the annotation information at once.
Figure 10B:
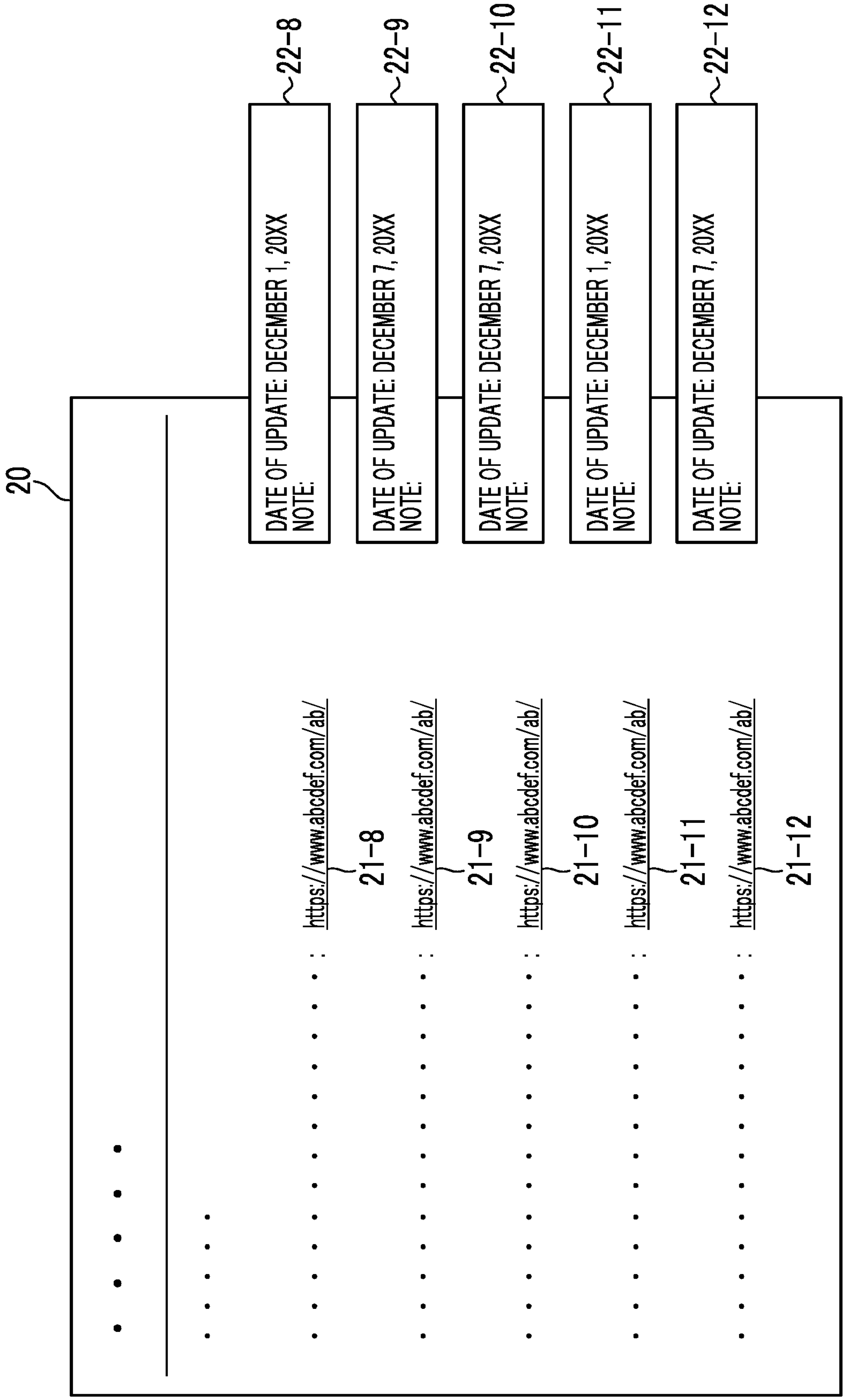

FIGS. 10A and 10B are diagrams illustrating a specific example of conversion of the annotation information at once. FIG. 10A is a diagram illustrating the electronic document on which a plurality of pieces of annotation information before performing the conversion at once are displayed. FIG. 10B is a diagram illustrating the electronic document on which a plurality of pieces of annotation information after performing the conversion at once are displayed.

In each of annotation information 22-8 corresponding to a link object 21-8 and annotation information 22-11 corresponding to a link object 21-11 among link objects 21-8 to 21-12 displayed on the electronic document 20 illustrated in FIG. 10A, "date of update: Dec. 1, 20XX note: . . . " is described as the annotation information. That is, display aspects of the annotation information 22-8 and 22-11 indicate that the content of the information about the web page of the link destination is in a normal state.

On the other hand, in each of annotation information 22-9 corresponding to the link object 21-9, annotation information 22-10 corresponding to the link object 21-10, and annotation information 22-12 corresponding to the link object 21-12, "date of update: Dec. 1, 20XY ★ one year has elapsed after conversion" is described as the annotation information. That is, all of display aspects of the annotation information 22-9, 22-10, and 22-12 indicate a state where the web page of the link destination is not accessible because of out-of-date URL information of the link destination.

Here, in a case where the user performs an operation for executing the update of the annotation information at once in the state of the electronic document illustrated in FIG. 10A, a plurality of pieces of annotation information in a state where the URL of the link destination is a broken link are acquired again and are updated at once. Specifically, the annotation information of each of the annotation information 22-9 corresponding to the link object 21-9, the annotation information 22-10 corresponding to the link object 21-10, and the annotation information 22-12 corresponding to the link object 21-12 is acquired again and is updated at once. Then, the display aspect of each of the annotation information 22-9, 22-10, and 22-12 is changed to a normal display aspect as illustrated in FIG. 10B.

Figure 11:
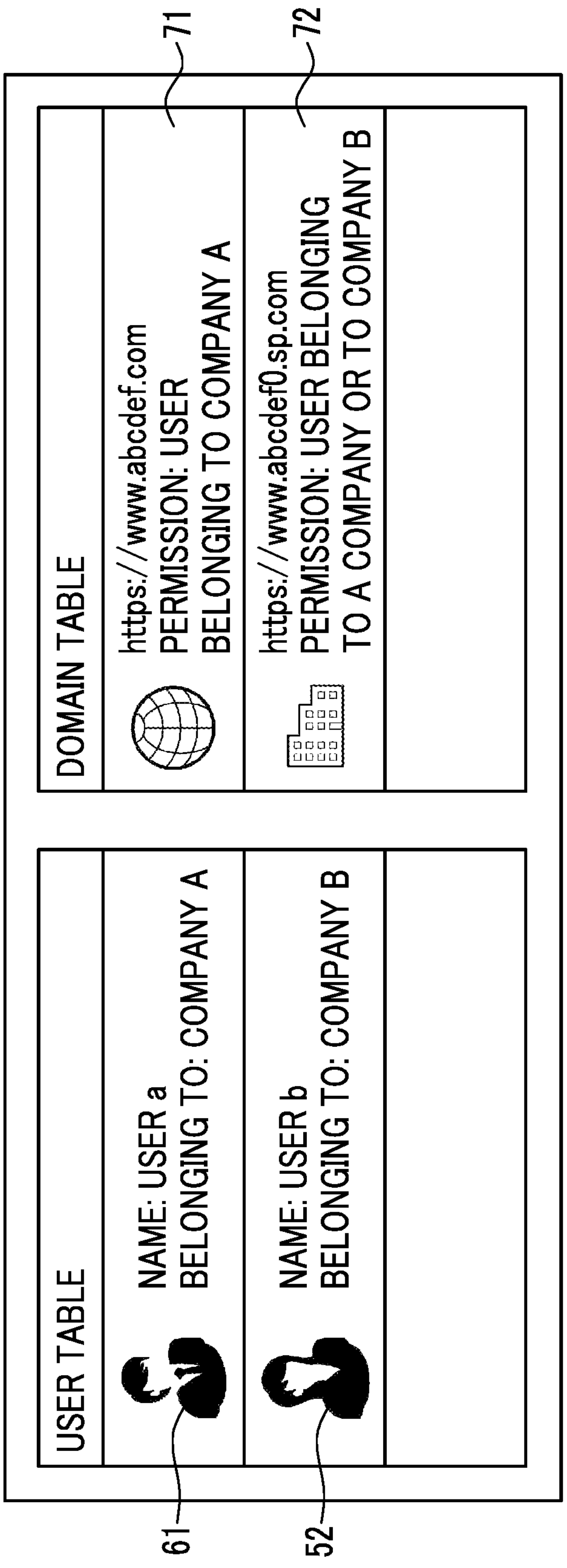
FIG. 11 is a diagram illustrating a specific example of a method of managing permission to access a web page of a link destination.

FIG. 11 is a diagram illustrating a specific example of a method of managing permission to access the web page of the link destination.

As described above, the information about the web page stored in the web page DB 133 and the information related to the user stored in the user DB 134 are associated with each other. Specifically, for example, the association is performed using a user table consisting of information extracted from the user DB 134 and a domain table consisting of information extracted from the web page DB 133 as illustrated in FIG. 11.

Whether or not the user has access permission is determined based on, for example, a combination of a domain of the URL of the web page and an organization name to which the user belongs. A user 61 of a name "user a" belonging to "company A" and a user 62 of a name "user b" belonging to "company B" are illustrated in the user table in FIG. 11. Here, company B is a subsidiary of company A.

In addition, information related to the access permission to each of web pages 71 and 72 is illustrated in the domain table in FIG. 11. In the information, a domain "abcdef.com" indicating a web page that can be accessed by the user belonging to company A is shown in a URL of the web page 71. In addition, a domain "abcdef0.com" indicating a web page that can be accessed by the user belonging to company A and by the user belonging to company B, which is the subsidiary of company A, is shown in a URL of the web page 72. Thus, the user a can access the web pages 71 and 72, and the user b can access the web page 72 but cannot access the web page 71.

In this case, in a case where the user a opens an electronic document including a link object having the web page 71 as a link destination and a link object having the web page 72 as a link destination, annotation information associated with the link object having the web page 71 as a link destination and annotation information associated with the link object having the web page 72 as a link destination are displayed on the electronic document. On the other hand, in a case where the user b opens the same electronic document, the annotation information associated with the link object having the web page 72 as a link destination is displayed on the electronic document, but the annotation information associated with the link object having the web page 71 as a link destination is not displayed on the electronic document because the user b is determined as not having the access permission.

In a case where the access permission is set for the web page of the link destination of the link object included in the electronic document, the annotation information associated with the information for accessing the web page is displayed in a case where the user having the access permission opens the electronic document. On the other hand, in a case where the user not having the access permission opens the electronic document, the annotation information associated with the information for accessing the web page is not displayed.

Other Exemplary Embodiments

While the present exemplary embodiment has been described above, the present invention is not limited to the exemplary embodiment. In addition, effects of the present invention are not limited to the effects disclosed in the exemplary embodiment. For example, both of the configuration of the information processing system 1 illustrated in FIG. 1 and the hardware configuration of the management server 10 illustrated in FIG. 2 are merely examples for achieving the object of the present invention and are not particularly limited. In addition, the functional configuration of the management server 10 illustrated in FIG. 3 and the functional configuration of the user terminal 30 illustrated in FIG. 4 are merely examples and are not particularly limited. As long as the information processing system 1 in FIG. 1 is provided with a function with which the above processing can be executed as a whole, a functional configuration to be used to implement the function is not limited to the examples in FIG. 3 and FIG. 4.

In addition, the order of the steps of the processing of the management server 10 illustrated in FIG. 5 and FIG. 6 is merely an example and is not particularly limited. Not only the processing is performed in time series along the illustrated order of the steps, but also the processing may not be performed in time series and may be parallelly or individually performed. In addition, the specific examples illustrated in FIG. 7 to FIG. 11 are merely an example and are not particularly limited.

Supplementary Note (((1)))

An information processing system comprising:

one or a plurality of processors configured to:

in a case where a link object that is included in an electronic document and that is associated with information for accessing a web page is designated, access the web page and acquire information about the web page;

based on the acquired information about the web page, convert the web page into another electronic document of a format displayable in an offline environment and manage the other electronic document in association with annotation information; and display the annotation information on the electronic document in association with the link object.

(((2)))

The information processing system according to (((1))), wherein the one or the plurality of processors are configured to:

display information obtained by summarizing the information about the web page as the annotation information.

(((3)))

The information processing system according to (((2))), wherein the one or the plurality of processors are configured to:

display information indicating a timing at which the web page is converted into the other electronic document as the information obtained by summarizing the information about the web page.

(((4)))

The information processing system according to any one of (((1))) to (((3))), wherein the one or the plurality of processors are configured to:

in a case where a predetermined condition is satisfied, display information indicating satisfaction of the predetermined condition on the electronic document as the annotation information.

(((5)))

The information processing system according to (((4))), wherein the one or the plurality of processors are configured to:

as the information indicating satisfaction of the predetermined condition, display information indicating elapse of a predetermined period since acquiring the information about the web page on the electronic document as the annotation information.

(((6)))

The information processing system according to (((4))), wherein the one or the plurality of processors are configured to:

as the information indicating satisfaction of the predetermined condition, display information indicating that the web page is not accessible using the information for accessing the web page, on the electronic document as the annotation information.

(((7)))

The information processing system according to (((4))), wherein the one or the plurality of processors are configured to:

as the information indicating satisfaction of the predetermined condition, display information indicating that a security vulnerability is identified on the web page, on the electronic document as the annotation information.

(((8)))

The information processing system according to any one of (((1))) to (((7))), wherein the one or the plurality of processors are configured to:

in a case where a predetermined condition is satisfied, not display the annotation information on the electronic document.

(((9)))

The information processing system according to (((8))), wherein the one or the plurality of processors are configured to:

in a case where a predetermined period has elapsed since acquiring the information about the web page as the predetermined condition, not display the annotation information on the electronic document.

(((10)))

The information processing system according to (((9))), wherein the one or the plurality of processors are configured to:

determine the predetermined period based on a schedule of a user related to use of the electronic document.

(((11)

The information processing system according to (((8))), wherein the one or the plurality of processors are configured to:

in a case where designation indicating not displaying the annotation information is provided by a user as the predetermined condition, not display the annotation information on the electronic document.

(((12)))

The information processing system according to any one of (((1))) to (((11))), wherein the one or the plurality of processors are configured to:

change a display aspect of the annotation information on the electronic document depending on content of the information about the web page.

(((13)))

The information processing system according to (((12))), wherein the one or the plurality of processors are configured to:

change the display aspect of the annotation information on the electronic document in a case where the information about the web page includes at least one of information indicating elapse of a predetermined period since acquiring the information about the web page, information indicating that the web page is not accessible using the information for accessing the web page, or information indicating that a security vulnerability is identified on the web page.

(((14)))

The information processing system according to any one of (((1))) to (((13))), wherein the one or the plurality of processors are configured to:

in a case where a predetermined period has elapsed since converting the web page into the annotation information, acquire the information about the web page again and convert the acquired information into the annotation information.

(((15)))

The information processing system according to (((14))), wherein the one or the plurality of processors are configured to:

for a plurality of pieces of annotation information for which the predetermined period has elapsed since converting the web page into the annotation information, acquire the information about the web page again at once and update the annotation information at once.

(((16)))

A program causing a computer to implement:

a function of, in a case where a link object that is included in an electronic document and that is associated with information for accessing a web page is designated, accessing the web page and acquiring information about the web page;

a function of, based on the acquired information about the web page, converting the web page into another electronic document of a format displayable in an offline environment and managing the other electronic document in association with annotation information; and a function of displaying the annotation information on the electronic document in association with the link object.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

one or a plurality of processors configured to:

in a case where a link object that is included in an electronic document and that is associated with information for accessing a web page is designated, access the web page and acquire information about the web page;

based on the acquired information about the web page, convert the web page into another electronic document of a format displayable in an offline environment and manage the other electronic document in association with annotation information;

display the annotation information on the electronic document in association with the link object; and in response to an input operation of selecting the annotation information displayed on the electronic document being performed, display the other electronic document.

2. The information processing system according to claim 1, wherein the one or the plurality of processors are configured to:

display information obtained by summarizing the information about the web page as the annotation information.

3. The information processing system according to claim 2, wherein the one or the plurality of processors are configured to:

display information indicating a timing at which the web page is converted into the other electronic document as the information obtained by summarizing the information about the web page.

4. The information processing system according to claim 1, wherein the one or the plurality of processors are configured to:

in a case where a predetermined condition is satisfied, display information indicating satisfaction of the predetermined condition on the electronic document as the annotation information.

5. The information processing system according to claim 4, wherein the one or the plurality of processors are configured to:

as the information indicating satisfaction of the predetermined condition, display information indicating elapse of a predetermined period since acquiring the information about the web page on the electronic document as the annotation information.

6. The information processing system according to claim 4, wherein the one or the plurality of processors are configured to:

as the information indicating satisfaction of the predetermined condition, display information indicating that the web page is not accessible using the information for accessing the web page, on the electronic document as the annotation information.

7. The information processing system according to claim 4, wherein the one or the plurality of processors are configured to:

as the information indicating satisfaction of the predetermined condition, display information indicating that a security vulnerability is identified on the web page, on the electronic document as the annotation information.

8. The information processing system according to claim 1, wherein the one or the plurality of processors are configured to:

in a case where a predetermined condition is satisfied, not display the annotation information on the electronic document.

9. The information processing system according to claim 8, wherein the one or the plurality of processors are configured to:

in a case where a predetermined period has elapsed since acquiring the information about the web page as the predetermined condition, not display the annotation information on the electronic document.

10. The information processing system according to claim 9, wherein the one or the plurality of processors are configured to:

determine the predetermined period based on a schedule of a user related to use of the electronic document.

11. The information processing system according to claim 8, wherein the one or the plurality of processors are configured to:

in a case where designation indicating not displaying the annotation information is provided by a user as the predetermined condition, not display the annotation information on the electronic document.

12. The information processing system according to claim 1, wherein the one or the plurality of processors are configured to:

change a display aspect of the annotation information on the electronic document depending on content of the information about the web page.

13. The information processing system according to claim 12, wherein the one or the plurality of processors are configured to:

change the display aspect of the annotation information on the electronic document in a case where the information about the web page includes at least one of information indicating elapse of a predetermined period since acquiring the information about the web page, information indicating that the web page is not accessible using the information for accessing the web page, or information indicating that a security vulnerability is identified on the web page.

14. The information processing system according to claim 1, wherein the one or the plurality of processors are configured to:

in a case where a predetermined period has elapsed since converting the web page into the annotation information, acquire the information about the web page again and convert the acquired information into the annotation information.

15. The information processing system according to claim 14, wherein the one or the plurality of processors are configured to:

for a plurality of pieces of annotation information for which the predetermined period has elapsed since converting the web page into the annotation information, acquire the information about the web page again at once and update the annotation information at once.

16. An information processing method comprising:

in a case where a link object that is included in an electronic document and that is associated with information for accessing a web page is designated, accessing the web page and acquiring information about the web page;

based on the acquired information about the web page, converting the web page into another electronic document of a format displayable in an offline environment and managing the other electronic document in association with annotation information;

displaying the annotation information on the electronic document in association with the link object; and in response to an input operation of selecting the annotation information displayed on the electronic document being performed, displaying the other electronic document.

17. The information processing system according to claim 1, wherein the one or the plurality of processors are configured to:

in response to determining that a predetermined time period has elapsed since acquiring the information about the web page, delete the annotation information from the electronic document.

18. A non-transitory computer readable medium storing a program causing a computer to implement:

a function of, in a case where a link object that is included in an electronic document and that is associated with information for accessing a web page is designated, accessing the web page and acquiring information about the web page;

a function of, based on the acquired information about the web page, converting the web page into another electronic document of a format displayable in an offline environment and managing the other electronic document in association with annotation information;

a function of displaying the annotation information on the electronic document in association with the link object; and a function of, in response to an input operation of selecting the annotation information displayed on the electronic document being performed, displaying the other electronic document.

* * * * *